United States Patent
Shimizu et al.

(10) Patent No.: US 6,287,744 B1
(45) Date of Patent: Sep. 11, 2001

(54) METHOD OF AND APPARATUS FOR MANUFACTURING INSTANT PHOTOGRAPHY FILM UNIT

(75) Inventors: Makoto Shimizu; Hideaki Kataoka; Hiroaki Tanaka; Tatsuo Shiino; Takayuki Kambara; Hisashi Kikuchi; Toru Shimizu, all of Minamiashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/609,245

(22) Filed: Jun. 30, 2000

(30) Foreign Application Priority Data

Jul. 2, 1999 (JP) .................................. 11-189713
Jul. 2, 1999 (JP) .................................. 11-189714

(51) Int. Cl.$^7$ .............................. G03C 8/46; G03C 8/48; G03D 9/02
(52) U.S. Cl. .................... 430/207; 430/208; 430/209; 430/498; 430/499; 396/528; 396/583
(58) Field of Search ..................................... 430/207, 208, 430/209, 498, 499; 396/528, 583

(56) References Cited

U.S. PATENT DOCUMENTS

| | | | |
|---|---|---|---|
| 3,752,723 | * 8/1973 | Bruneau | 156/157 |
| 4,042,395 | * 8/1977 | Tone et al. | 430/207 |
| 4,312,939 | 1/1982 | McCole | 430/497 |
| 5,023,163 | * 6/1991 | Simizu et al. | 430/207 |

FOREIGN PATENT DOCUMENTS 62-55772   11/1987   (JP) .................................. G03C/7/00

* cited by examiner

*Primary Examiner*—Richard L. Schilling
(74) *Attorney, Agent, or Firm*—Sughrue, Mion, Zinn, Macpeak & Seas, PLLC

(57) ABSTRACT

After first, second, and third continuous members are bonded to each other in a laminated state, they are cut together to a predetermined length for thereby producing an instant photography film unit. A predetermined number of produced instant photography film units are stacked in a stacking station, and then automatically placed into a film pack in a packaging station. An overall process of manufacturing instant photography film units that are packaged is performed automatically and efficiently.

24 Claims, 11 Drawing Sheets

METHOD OF AND APPARATUS FOR MANUFACTURING INSTANT PHOTOGRAPHY FILM UNIT

BACKGROUND OF THE INVENTION

1. Field of the Invention

The present invention relates to a method of and an apparatus for manufacturing a self-developing instant photography film unit.

2. Description of the Related Art

With the recent popularity of instant cameras, self-developing instant photography film units are being mass-produced. An instant photography film unit comprises a mask sheet having an image frame which defines a picture size in its center, a photosensitive sheet having a photosensitive layer coated on a transparent or opaque support layer, a transparent sheet for extending a developing solution between itself and the photosensitive sheet, and a pair of rails or spacers disposed between the photosensitive sheet and the transparent sheet for defining a gap therebetween for the passage of the developing solution therein. A pod or container which stores the developing solution and a trap for trapping an excessive developing solution are attached to the mask sheet at respective opposite side edges of the image frame of the mask sheet.

Various types of instant photography film units have been known in the art. For example, according to one type of instant photography film unit, the photosensitive sheet is joined to the upper surface of the mask sheet, and the transparent sheet is joined to the upper surface of the photosensitive sheet by the rails interposed therebetween, and the pod and the trap are wrapped in the side edges of the mask sheet that are folded onto the transparent sheet perpendicularly to the rails. According to another type of instant photography film unit, the photosensitive sheet and the transparent sheet are stacked in a given order on the mask sheet, and the rails are attached so as to extend from the photosensitive sheet to the transparent sheet, and the pod and the trap are attached to the mask sheet perpendicularly to the rails.

There have been proposed various processes for manufacturing an instant photography film unit. For example, Japanese patent publication No. 62-55772 discloses one such proposed process for manufacturing an instant photography film unit. According to the disclosed process, as shown in FIG. 11 of the accompanying drawings, sheets 1, 2, one of which is a photosensitive sheet whereas the other is a transparent sheet, are joined to each other by a joining unit 3, and a rail web 4 is cut into a rail 5 that is heat-sealed over the sheet 2, which is wider than the sheet 1, transversely across the sheet 1.

The joined sheets 1, 2 are then cut along the central line of the rail 5 by a cutter 6, and then bonded to a mask sheet 8 by a heat sealer 7. In a peripheral edge joining station 9, the entire edge of the sheet 2 is bonded to the mask sheet 8 in surrounding relationship to an image zone opening defined in the mask sheet 8. In an attaching station 10, a solution pod 11 and a trap 12 are bonded to respective opposite sides of the mask sheet 8, and thereafter folded onto the opposite sides of the mask sheet 8 in a folding station 13. Then, the assembly is sealed in a sealing station 14, and the mask sheet 8 is cut off in a cutting station 15, thus producing an instant photography film unit.

The conventional arrangement requires that the worker store a certain number of manufactured instant photography film units into a case. In order to prevent the instant photography film units from being irradiated with extraneous light, the worker needs to package the instant photography film units in a dark chamber. Therefore, the packaging process has been considerably tedious and time-consuming. Accordingly, the process of packaging the manufactured instant photography film units to produce film unit packages has been considerably cumbersome and makes it impossible to perform the entire manufacturing process efficiently.

The sheets 1, 2 and the mask sheet 8 are exposed to temperature changes and humidity changes in the heat sealing process. Particularly, the photosensitive sheet is susceptible to humidity, and tends to shrink in the manufacturing process. When the sheets 1, 2 shrink, the mask sheet 8 to which these sheets 1, 2 are attached is displaced in the direction in which it is fed, making it difficult to attach the pod 11 and the trap 12 in accurate positions with respect to the opening in the mask sheet 8, and the instant photography film units tend to be severed at different positions. As a consequence, it is impossible to manufacture high-quality instant photography film units.

According to the above conventional method, the pod 11 and the trap 12 are bonded by heat sealing after they have been supplied one to each side of the mask sheet 8. Therefore, it is time-consuming to join the pod 11 and the trap 12, and hence the entire process for manufacturing instant photography film units cannot be made more efficient.

In the above manufacturing method, the pitch time of each of the steps, particularly those steps requiring heat bonding, ranging from the supply of the sheets 1, 2 to the completion of instant photography film units, is relatively long. Since the pitch times of the steps are determined on the basis of the pitch times of the heating bonding steps, undesirable idle times are present in the entire process, making it impossible to carry out the entire process for manufacturing instant photography film units efficiently.

After the joined sheets 1, 2 have been cut along the central line of the rail 5, the sheets 1, 2 are bonded to the mask sheet 8. Therefore, a structure is required for accurately positioning the severed sheets 1, 2 on the mask sheet 8. The positioning structure makes the entire system and process complex, and also makes the cost of manufactured instant photography film units high.

SUMMARY OF THE INVENTION

It is a general object of the present invention to provide a method of and an apparatus for manufacturing an instant photography film unit automatically and efficiently from the fabrication of an instant photography film unit to the packaging thereof.

A major object of the present invention is to provide a method of and an apparatus for manufacturing an instant photography film unit by controlling the feeding of a continuous member to position the continuous member easily and highly accurately.

A primary object of the present invention is to provide a method of and an apparatus for manufacturing an instant photography film unit by efficiently supplying a developing solution container and an excessive developing solution trapping member at an image frame of a continuous member for thereby speeding up a manufacturing process.

Another primary object of the present invention is to provide a method of and an apparatus for manufacturing an instant photography film unit with an effectively simplified process and arrangement for efficiently and economically manufacturing an instant photography film unit.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
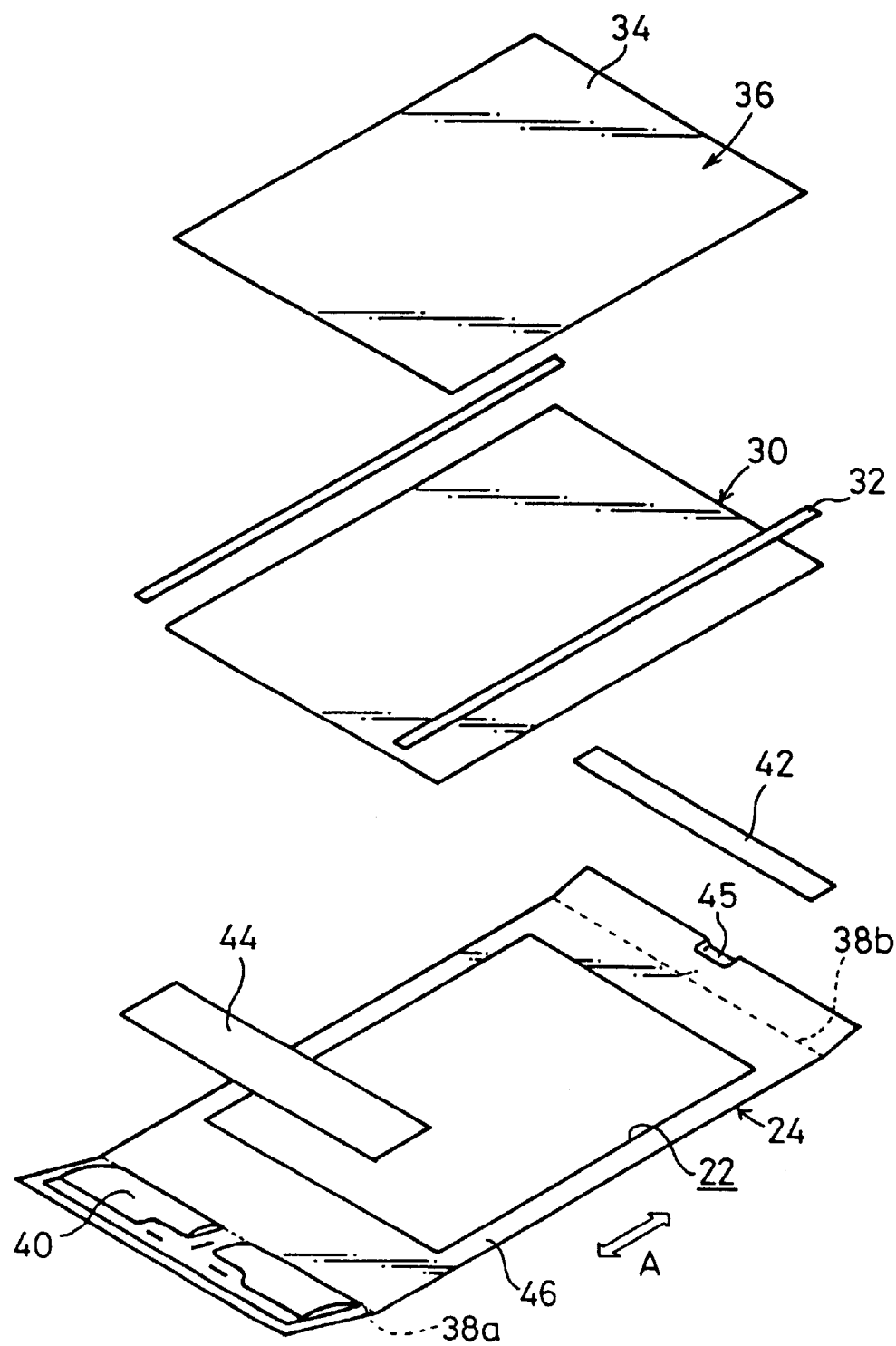
FIG. 1 is an exploded perspective view of an instant photography film unit manufactured by a manufacturing method according to a first embodiment of the present invention.
Figure 2:
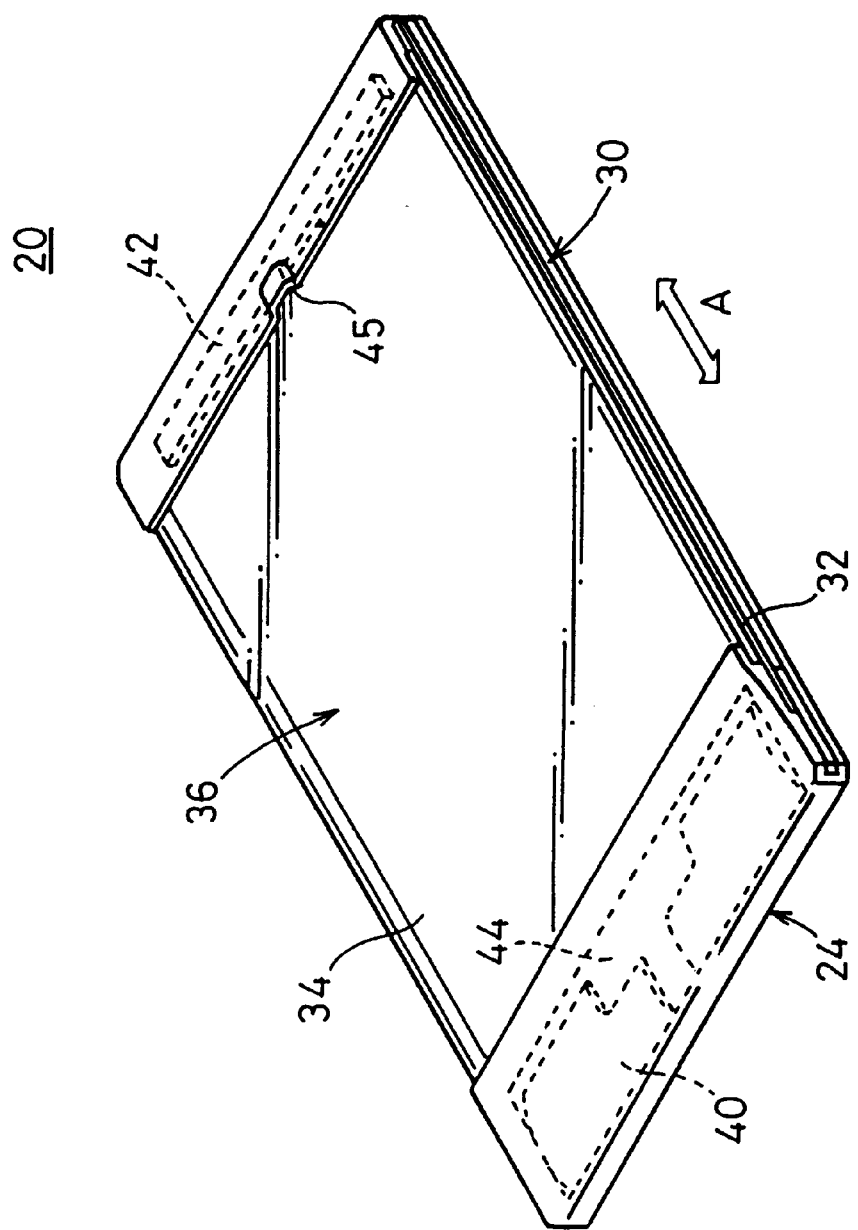
FIG. 2 is a perspective view of the instant photography film unit.

FIG. 1 shows in exploded perspective an instant photography film unit 20 manufactured by a manufacturing method according to a first embodiment of the present invention. FIG. 2 shows the instant photography film unit 20 in perspective.

As shown in FIGS. 1 and 2, the instant photography film unit 20 comprises a mask sheet 24 having an image frame 22, a photosensitive sheet 30 having an image reception layer and a photosensitive layer, a pair of spacers 32 superposed on the photosensitive sheet 30 on the side of the photosensitive layer, and a transparent cover sheet 36 superposed on the spacers 32 and having an exposure surface 34.

The mask sheet 24 has a pair of folds (thinned regions) 38a, 38b on its opposite end portions in the longitudinal direction in which the mask sheet 24 extends, i.e., in the direction indicated by the arrow A. A pod or container 40 which stores a developing solution and a trap 42 for trapping an excessive developing solution are bonded to regions of the mask sheet 24 outside of the folds 38a, 38b. An undersheet 44 is attached to the mask sheet 24 inside of the fold 38a.

After the photosensitive sheet 30, the spacers 32, and the cover sheet 36 are superposed on and joined to the mask sheet 24, and the undersheet 44 is joined to the mask sheet 24, the opposite ends of the mask sheet 24 are folded back at the folds 38a, 38b and joined to the cover sheet 36, thus completing the instant photography film unit 20. The instant photography film unit 20 has an air passage 45 defined in the folded region of the mask sheet 24 near the trap 42.

The mask sheet 24 is made of colored polyethylene terephthalate (PET), and has a heat-sealing adhesive layer 46 on one surface thereof. Each of the spacers 32 comprises a transparent or colored PET layer and a light shield layer disposed on one surface of the transparent or colored PET layer, and heat-sealing adhesive layers are disposed on respective opposite surfaces of each of the spacers 32.

Figure 3:
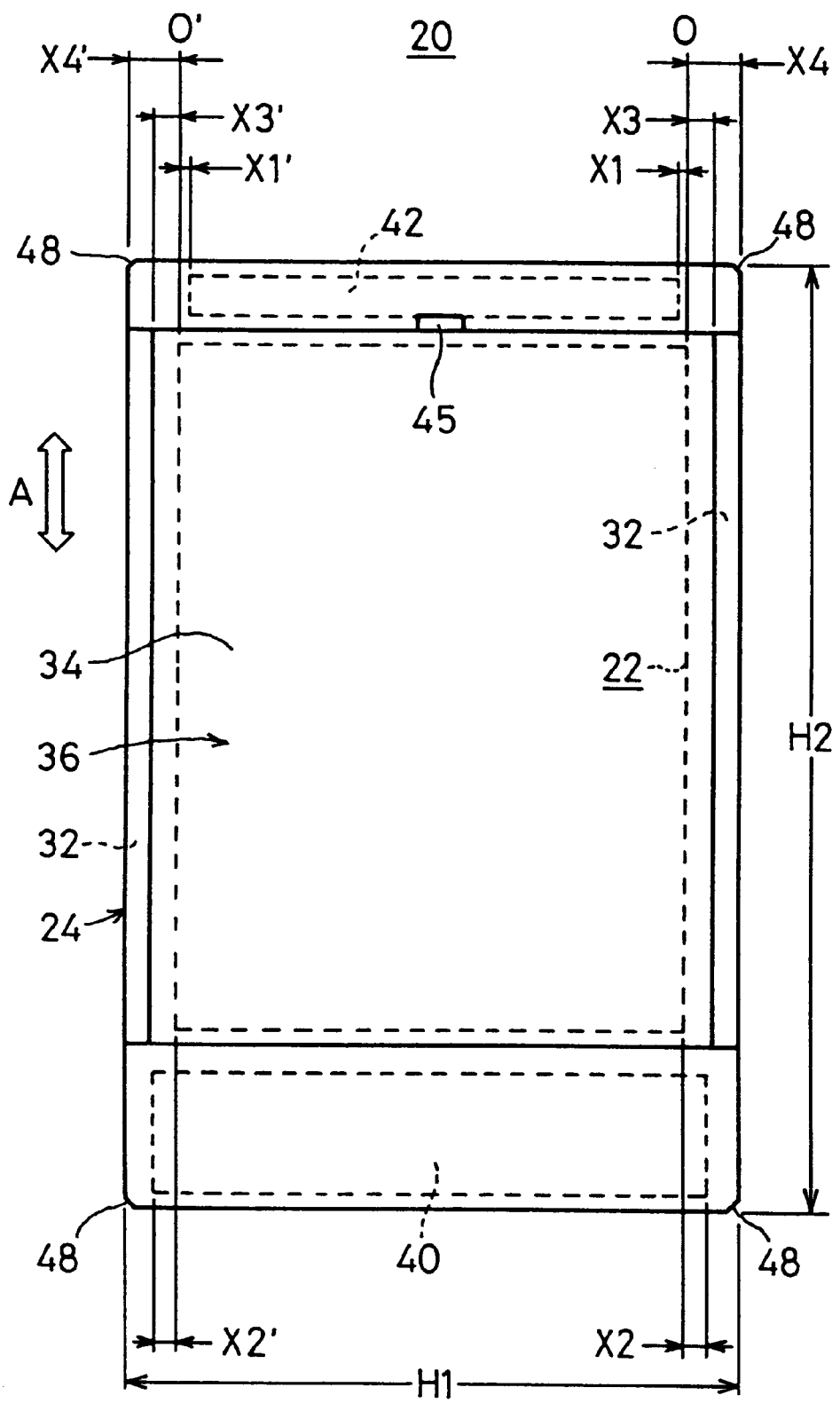
FIG. 3 is a front elevational view of the instant photography film unit as viewed from an exposure surface thereof.

As shown in FIG. 3, the instant photography film unit 20 has outer dimensions H1, H2 substantially equal to those of an ID card specified according to ISO 7810 or JIS X6301. Specifically, the outer dimension H1 in the transverse direction is set to 54 mm, and the outer dimension H2 in the longitudinal direction is set to 85.6 mm. The instant photography film unit 20 has four beveled corners 48.

The instant photography film unit 20 has predetermined levels of assembling accuracy in the transverse direction.

The assembling accuracy is determined on the basis of the image frame 22 in the instant photography film unit 20, and covers distances X1, X1' from reference lines O, O' passing through the opposite side ends of the image frame 22 to opposite ends of the trap 42, distances X2, X2' from the reference lines O, O' to opposite ends of the pod 40, distances X3, X3' from the reference lines O, O' to inner opposite ends of the spacers 32, and distances X4, X4' from the reference lines O, O' to opposite ends of the instant photography film unit 20. The accuracy of the distances X1, X1' is in the range of ±0.5 mm, and the accuracy of the distances X2, X2' is in the range of ±0.3 mm. The accuracy of the distances X3, X3' is in the range of ±0.5 mm, and the accuracy of the distances X4, X4' is in the range of ±0.5 mm.

Figure 4:
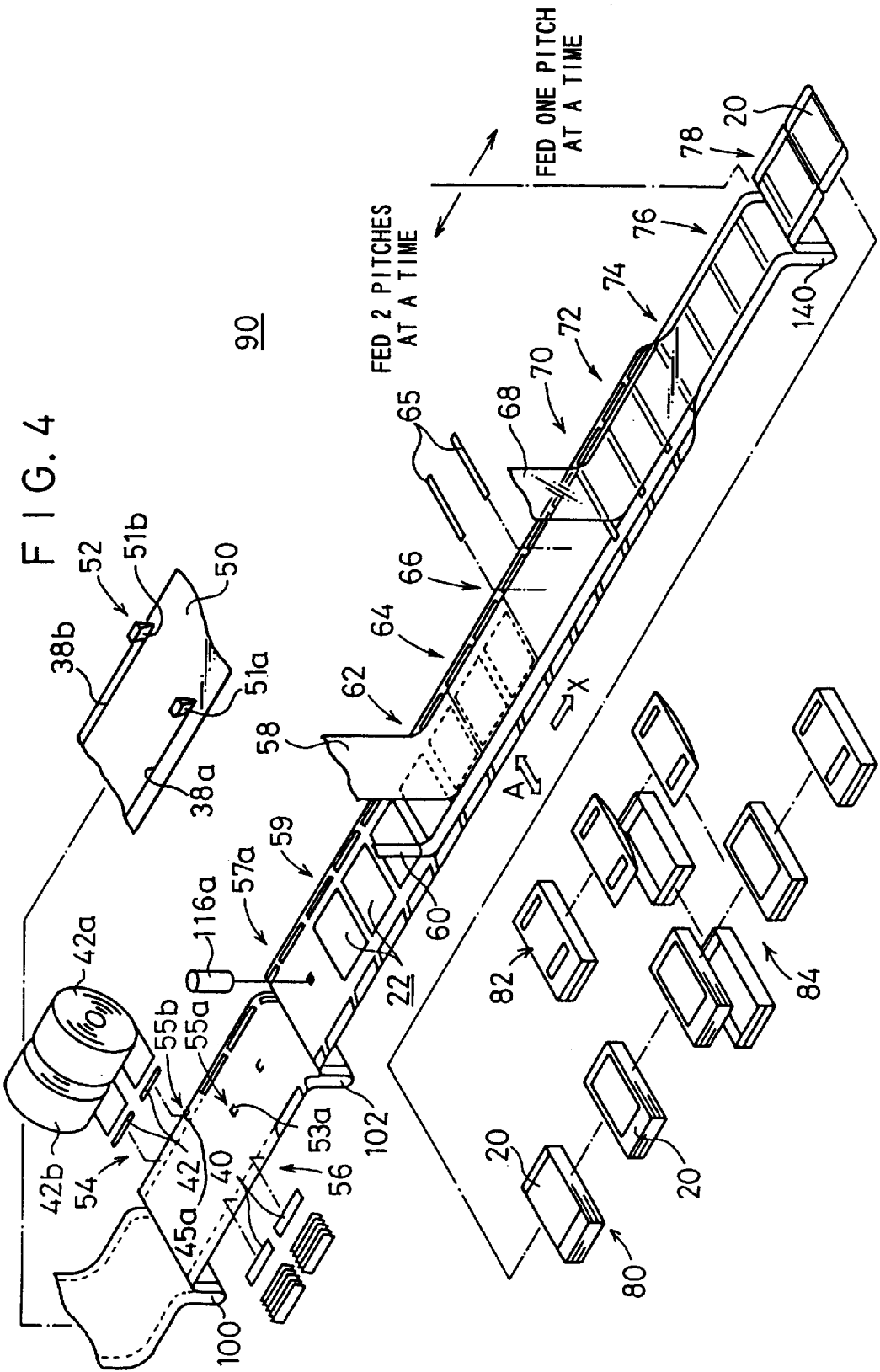
FIG. 4 is a schematic perspective view illustrative of the manufacturing method according to the first embodiment.

FIG. 4 schematically illustrates the method of manufacturing the instant photography film unit 20 according to the first embodiment of the present invention. A first continuous member 50 from which the mask sheet 24 is formed is fed two pitches at a time in the direction indicated by the arrow X which is perpendicular to the longitudinal direction in which the mask sheet 24 extends i.e., the direction indicated by the arrow A. A fold forming station 52 is disposed upstream with respect to the direction in which the first continuous member 50 is fed (hereinafter referred to as "feeding direction"). The fold forming station 52 has a pair of heated steel members 51a, 51b for producing the folds 38a, 38b on opposite marginal side edges of the first continuous member 50.

Downstream of the folding station 52, there are disposed a trap attaching station 54 for attaching two traps 42 to one of the marginal side edges of the first continuous member 50 substantially simultaneously when the first continuous member 50 is stopped, a mark forming station 55a for forming a channel-shaped mark 53 as a positioning indicia in every other image frame 22 on the first continuous member 50, an air hole forming station 55b for forming a recess, i.e., a deformed area, 45a which will become the air passage 45 upon developing a processing agent, a pod attaching station 56 for attaching two pods 40 to the other of the marginal side edges of the first continuous member 50 substantially simultaneously when the first continuous member 50 is stopped, a mark detecting station 57a for detecting the position of the mark 53, and a punching station 59 for forming two image frames 22 in the first continuous member 50 substantially simultaneously when the first continuous member 50 is stopped.

A first joining station 62 for joining a second continuous member 58 which will become the photosensitive sheet 30 and a continuous sheet 60 which will become the undersheet 44 to the first continuous member 50 is disposed downstream of the punching station 59. A first heat-bonding station 64 for heat-bonding the second continuous member 58 and the continuous sheet 60 to the two image frames 22 of the first continuous member 50 is disposed downstream of the first joining station 62.

A second heat-bonding station 66 for temporarily bonding two rails 65 which are twice as wide as the spacers 32 to the opposite sides of the image frame 22 is disposed downstream of the first heat-bonding station 64. A heat-sealing adhesive has been coated on both surfaces of the rails 65. A second joining station 70 for attaching a third continuous member 68 which will become the cover sheet 36 is disposed downstream of the second heat-bonding station 66. A third heat-bonding station 72 for bonding the third continuous member 68 to the second continuous member 58 with the rails 65 is disposed downstream of the second joining station 70.

Downstream of the third heat-bonding station 72, there are disposed a folding station 74 for folding back the opposite marginal side edges of the first continuous member 50 to wrap the trap 42 and the pod 40, and a fourth heat-bonding station 76 for integrally heat-bonding the folded marginal side edges of the first continuous member 50 over two instant photography film units 20. A cutting station or beveling station 78 is disposed downstream of the fourth heat-bonding station 76 for successively cutting off and beveling corners of the assembly substantially intermediate between two adjacent rails 65 thereby to separate instant photography film units 20 one at a time.

Downstream of the cutting station 78, there are disposed a stacking station 80 for automatically stacking a predetermined number of, e.g., 10, instant photography film units 20, at a time, and a packaging station 84 for reversing the instant photography film units 20 stacked at the stacking station 80 and automatically placing the instant photography film units 20 into a film pack 82.

In the first embodiment, the length, i.e., the outer dimension H1, of an instant photography film unit 20 perpendicular to the longitudinal direction indicated by the arrow A is used as a unit pitch for feeding the produced assembly. From the upstream process end down to the fourth heat-bonding station 76, the assembly is fed a plurality of pitches, i.e., two pitches, at a time so as to be able to increase a stop time and produce instant photography film units at a high speed. In the cutting station 78, the assembly is fed one pitch at a time for beveling the corners.

Figure 5:
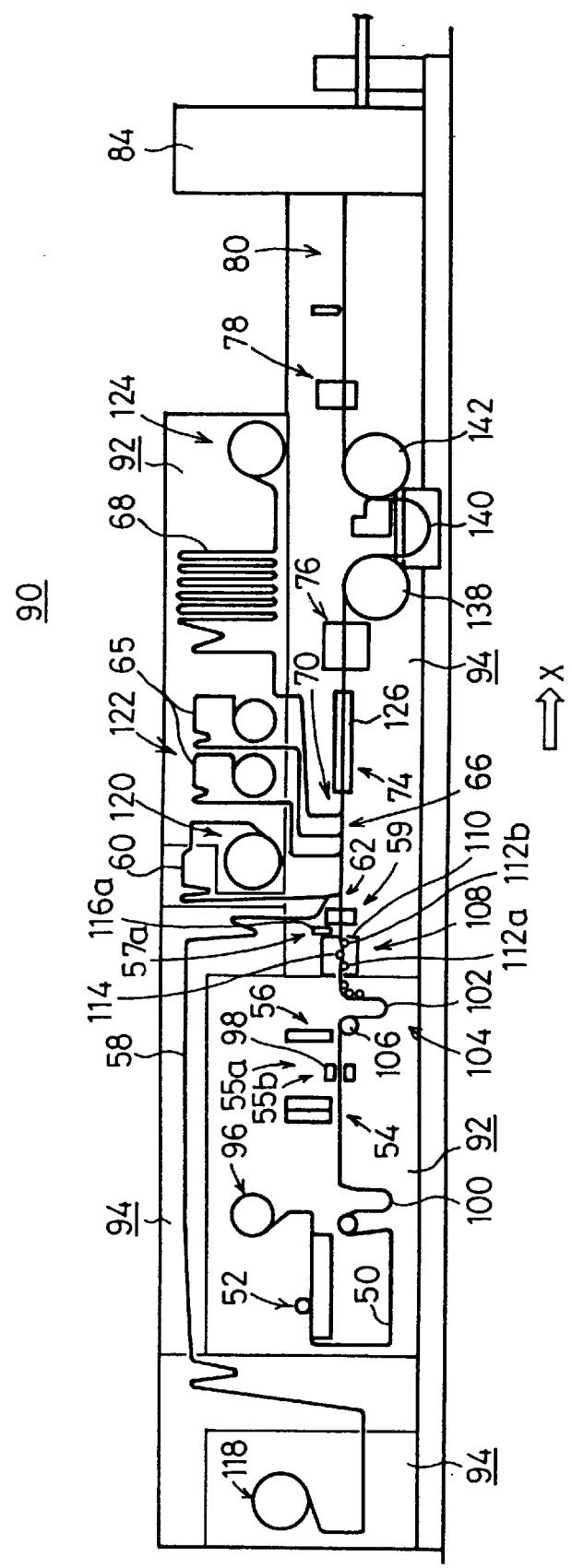
FIG. 5 is a schematic side elevational view of a manufacturing system for carrying out the manufacturing method according to the first embodiment.
Figure 6:
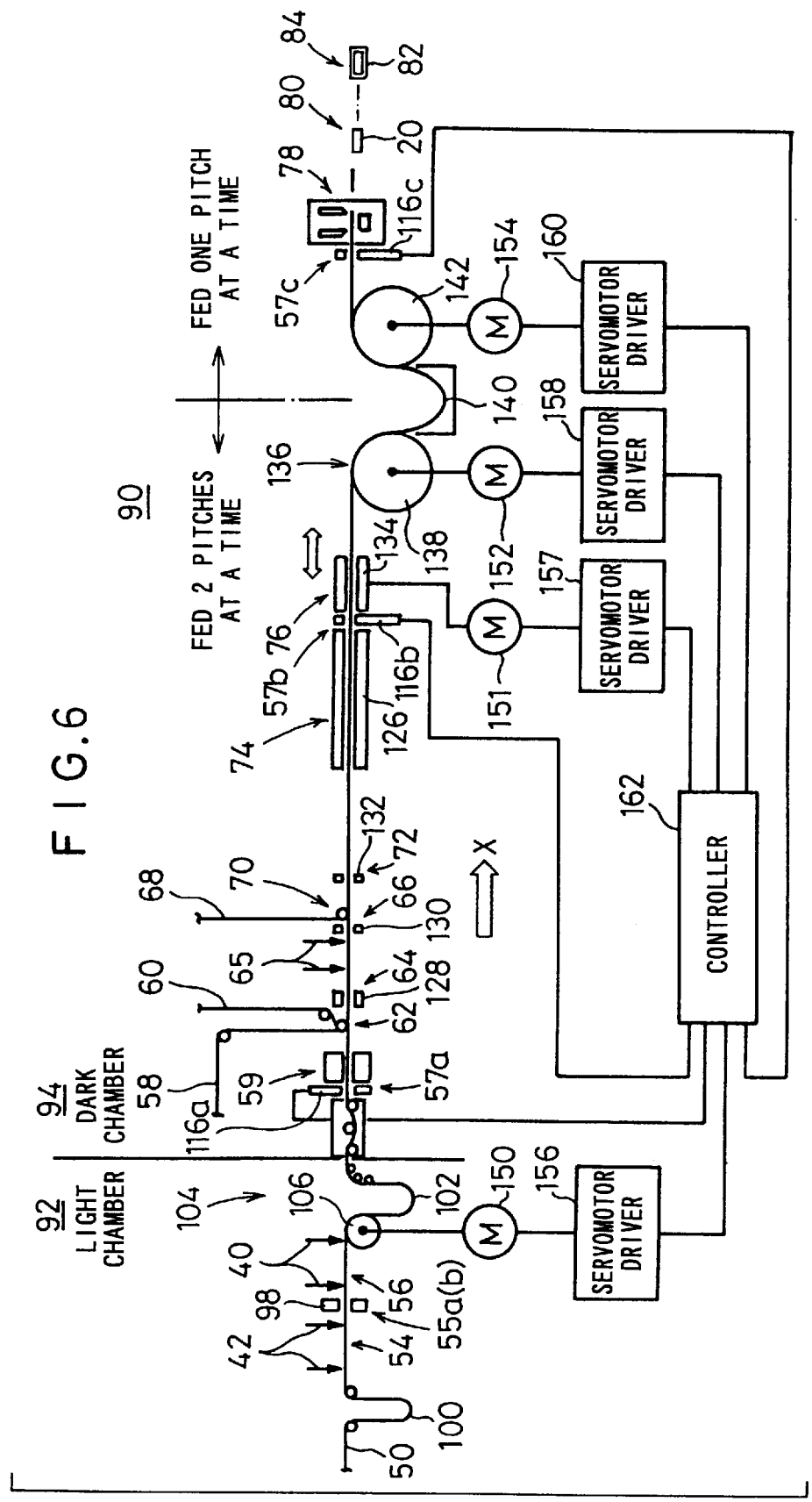
FIG. 6 is a schematic side elevational view, partly in block form, of the manufacturing system shown in FIG. 5 which includes a control arrangement.

FIGS. 5 and 6 schematically show a manufacturing system 90 for carrying out the method of manufacturing the instant photography film unit 20 according to the first embodiment.

As shown in FIGS. 5 and 6, the manufacturing system 90 includes a light chamber 92 and a dark chamber 94, and has a mask sheet material supply 96 for unreeling the first continuous member 50 from a roll. The fold forming station 52, the trap attaching station 54, the mark forming station 55*a*, the air hole forming station 55*b*, and the pod attaching station 56 are disposed downstream of the mask sheet material supply 96.

As shown in FIG. 4, the trap attaching station 54 has two trap rolls 42*a*, 42*b* which are unwound and cut to predetermined lengths by trap cutters (not shown), thus producing two traps 42. The pod attaching station 56 is supplied with two rows of pods 40 that can be supplied two at a time to the first continuous member 50. The mark forming station 55*a*, which is disposed between the trap attaching station 54 and the pod attaching station 56, has a mark punch 98 (see FIGS. 5 and 6) for forming a substantially channel-shaped mark 53 in the first continuous member 50. The air hole forming station 55*b* is located in the same position as the mark forming station 55*a*, and has a press (not shown) for forming a recess centrally in the edge of the first continuous member 50 near an attached trap.

Between the fold forming station 52 and the trap attaching station 54, there is disposed a first free loop 100 for keeping away from influence of the tension that acts on the first continuous member 50 when a continuous feeding mode changes to a pitch feeding mode for the first continuous member 50. A second free loop 102 similar in function to the first free loop 100 is disposed between the pod attaching station 56 and the mark detecting station 57*a*. A master drum 106 serving as a first feed means 104 is disposed upstream of the second free loop 102 and controlled for feeding the first continuous member 50 a predetermined number of pitches at a time from the first free loop 100 to the pod attaching station 56.

The dark chamber 94 extends from both sides of the light chamber 92 over the light chamber 92. A light shield mechanism 108 for shielding the dark chamber 94 against light from the light chamber 92 is disposed downstream of the second free loop 102. The light shield mechanism 108 has a light shield box 110, a pair of support rollers 112*a*, 112*b* disposed in the light shield box 110 for supporting the lower surface of the first continuous member 50, and a presser roller 114 disposed between the support rollers 112*a*, 112*b* for pressing the upper surface of the first continuous member 50 downwardly to curve the first continuous member 50. The mark detecting station 57*a* is disposed closely downstream of the light shield mechanism 108, and has a CCD camera 116*a* for detecting the mark 53.

A photosensitive member supply unit 118 for unwinding the second continuous member 58 from its roll is disposed upstream of the light chamber 92. The second continuous member 58 supplied from the photosensitive member supply unit 118 passes above the mask sheet material supply 96 to the first joining station 62. An uncdersheet supply unit 120 for supplying the continuous sheet 60 is disposed above the first joining station 62. A rail supply unit 122 for supplying the rails 65 to the second heat-bonding station 66 is disposed downstream of the undersheet supply unit 120. A cover sheet supply unit 124 for supplying the third continuous member 68 to the second joining station 70 is disposed downstream of the rail supply unit 122.

The folding station 74 has a former 126 for inwardly folding the opposite marginal side edges of the first continuous member 50. The first through third heat-bonding stations 64, 66, 72 have respective two sets of heat bonding units 128, 130, 132 that are positionally adjustable in the feeding direction. The fourth heat-bonding station 76 has a flap sealing unit 134 that is movable in the feeding direction. A second feed means 136 for feeding the assembly two pitches at a time from the second free loop 102 to the fourth heat-bonding station 76 is disposed downstream of the flap sealing unit 134.

The second feed means 136 comprises a main feed drum 138 that is controlled to change the interval of feed pitches arbitrarily depending on the position of the mark 53 that is detected by the mark detecting station 57*a*. A cutting feed drum 142 is disposed downstream of the main feed drum 138 with a third free loop 140 interposed therebetween. The cutting feed drum 142 is controlled to feed a cutting process in the cutting station 78 one pitch at a time.

As shown in FIG. 6, frame detecting stations 57b, 57c for detecting the image frame 22 are disposed directly upstream of the fourth heat-bonding station 76 and the cutting station 78, respectively. The frame detecting stations 57b, 57c have respective CCD cameras 116b, 116c. The master drum 106, the flap sealing unit 134, the main feed drum 138, and the cutting feed drum 142 are coupled respectively to servomotors 150, 151, 152, 154 which are synchronously controlled by a controller 162 via respective servomotor drivers 156, 157, 158, 160. The controller 162 is supplied with image information from the CCD cameras 116a through 116c, and performs various control processes in the manufacturing system 90.

Operation of the manufacturing system 90 thus constructed will be described below with reference to an operation sequence, shown in FIG. 7, of the manufacturing method according to the first embodiment of the present invention.

Figure 7:
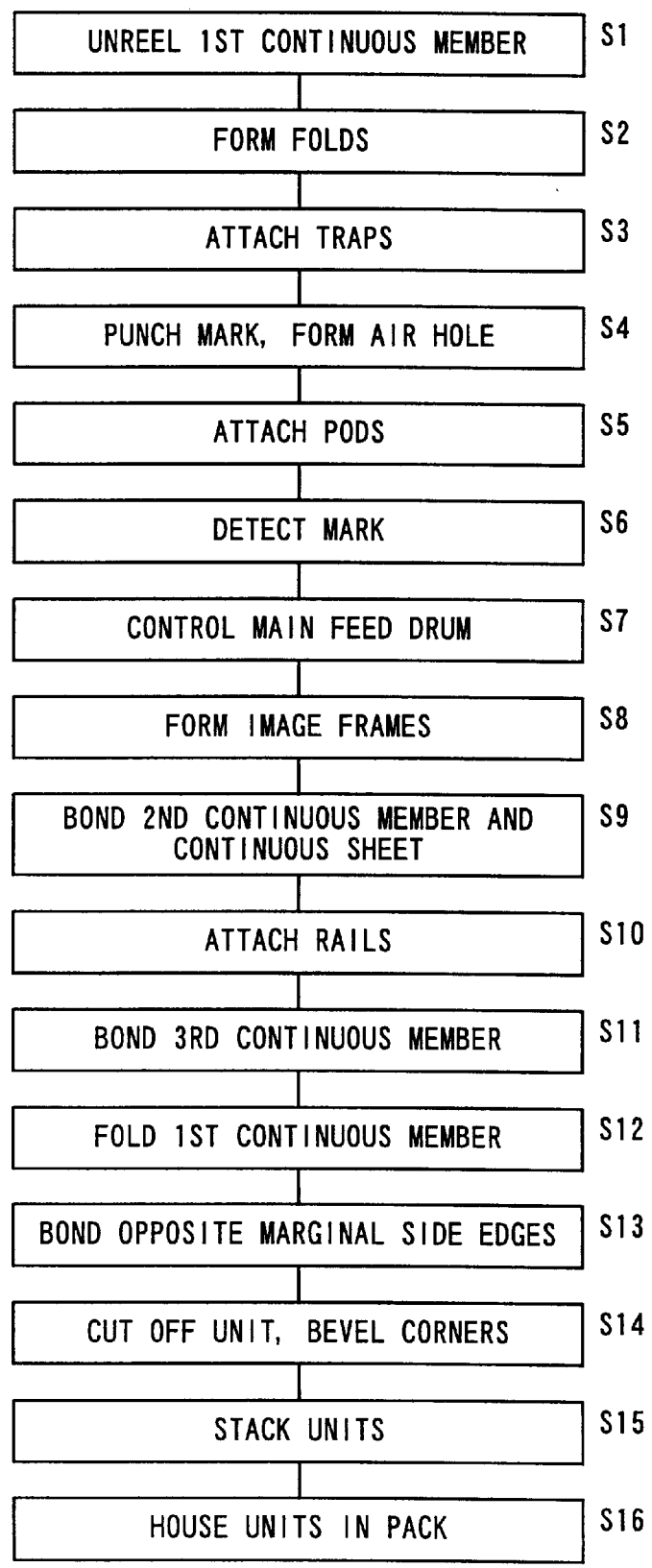
FIG. 7 is a flowchart of an operation sequence of the manufacturing method according to the first embodiment.

The manufacturing system 90 is controlled for its operation by the controller 162 to unreel the first continuous member 50 from its roll set in the mask sheet material supply 96 in step S1 (FIG. 7). The first continuous member 50 as it is continuously fed is processed to form folds 38a, 38b on its opposite marginal side edges in the fold forming station 52 in step S2, and then released from tension by the first free loop 100. Then, the first continuous member 50 is fed two pitches at a time in the direction indicated by the arrow X by the master drum 106.

Between the first free loop 100 and the second free loop 102, the first continuous member 50 is fed a preset length, i.e., two pitches, at a time, successively through the trap attaching station 54, the mark forming station 55a, the air hole forming station 55b, and the pod attaching station 56. In the trap attaching station 54, as shown in FIG. 4, the two trap rolls 42a, 42b are unwound and cut to respective widths, and two traps 42 are attached substantially simultaneously to one marginal side edge of the first continuous member 50 at respective positions that are spaced a given distance from each other when the first continuous member 50 is stopped in step S3.

In the mark forming station 55a, the mark punch 98 forms a substantially channel-shaped mark 53 in the first continuous member 50 in every other image frame 22, and in the air hole forming station 55b, a press (not shown) forms a recess 45a centrally in the marginal side edge, where the traps have been attached, of the first continuous member 50 in step S4. In the pod attaching station 56, two pods 40 are substantially simultaneously attached to the other marginal side edge of the first continuous member 50 at respective positions that are spaced a given distance from each other when the first continuous member 50 is stopped in step S5. The traps 42 and the pods 40 are sealed by a heat sealer (not shown) that is held against the lower surface of the first continuous member 50.

Downstream of the master drum 106, the first continuous member 50 is fed two pitches at a time in the direction indicated by the arrow X by the main feed drum 138. The first continuous member 50 is introduced from the light chamber 92 into the dark chamber 94 via the light shield mechanism 108. In the light shield mechanism 108, the first continuous member 50 is curved by the support rollers 112a, 112b and the presser roller 114 for effectively shielding the dark chamber 94 against entry of light from the light chamber 92.

The first continuous member 50 as it is introduced from the light shield box 110 of the light shield mechanism 108 into the dark chamber 94 is fed to the mark detecting station 57a where the mark 53 is detected by the CCD camera 116a. The position of the mark 53 is detected from image information of the mark 53 captured by the CCD camera 116a. The controller 162 processes the detected position based on preset information, and controls the servomotor 152 via the servomotor driver 158 to adjust the pitch feed distance by which the main feed drum 138 feeds the first continuous member 50 in step S7.

In the punching station 59, two image frames 22 are substantially simultaneously formed in the first continuous member 50 when the first continuous member 50 is stopped in step S8. In the first joining station 62, the second continuous member 58 and the continuous sheet 60 are unreeled from the photosensitive member supply unit 118 and the undersheet supply unit 120, respectively, and joined to the first continuous member 50. In the first heat-bonding station 64, the second continuous member 58 and the continuous sheet 60 are heat-bonded to the first continuous member 50 over the two image frames 22 in step S9.

Two rails 65 in the form of ribbons are unreeled from the rail supply unit 122 and cut to respective predetermined lengths. The cut rails 65 are heat-bonded to the second continuous member 58 and the continuous sheet 60 on respective opposite sides of the image frames 22 in the second heat-bonding station 66 in step S10. Then, the third continuous member 68 in the form of a roll in the cover sheet supply unit 124 is unreeled, and joined to the second continuous member 58 in the second joining station 70. Thereafter, the second and third continuous members 58, 68 are heat-bonded to each other by the rails 65 in the third heat-bonding station 72 in step S11.

In the folding station 74, the former 126 inwardly folds the opposite marginal side edges of the first continuous member 50 along the folds 38a, 38b, thereby wrapping the traps 42 and the pods 40 in step S12. Thereafter, the folded marginal side edges of the first continuous member 50 are heat-bonded by the flap sealing unit 134 in the fourth heat-bonding station 76 in step S13. By detecting an image frame 22 in the frame detecting station, the flap sealing unit 134 is controlled for its movement 57b to seal folded marginal side edges of the first continuous member 50 at a constant relative position with respect to the image frame 22.

The joined assembly of the first, second, and third continuous members 50, 58, 68 that are stacked together is transferred from the main feed drum 138 via the third free loop 140 to the cutting feed drum 142, and fed one pitch at a time in the direction indicated by the arrow X to the cutting station 78. In the cutting station 78, the joined assembly is cut off while beveling its four corners in step S14, producing an instant photography film unit 20. A certain number of instant photography film units 20 thus produced are stacked in the stacking station 80 in step S15. Then, the stacked instant photography film units 20 are delivered to the packaging station 84 where they are reversed, i.e., turned upside down, and automatically housed in a film pack 82 in step S16.

In the first embodiment, as described above, various components including the first, second, and third continuous members 50, 58, 68 are assembled and processed into an instant photography film unit 20, and a predetermined number of instant photography film units 20 are stacked and housed in a film pack 82. The successive steps of the manufacturing process are automatically performed.

Therefore, the worker is not required to carry out a tedious and time-consuming conventional manual process for manually gathering a predetermined number of instant photography film units 20 and placing them into a film pack 82. Rather, it is possible to continuously and efficiently produce packages of instant photography film units 20 placed in film packs 82.

After the mask sheet 24, the photosensitive sheet 30, and the cover sheet 36 are stacked and bonded together as the first, second, and third continuous members 50, 58, 68, and they are cut off together into instant photography film units 20. Consequently, the manufacturing system 90 is simplified in overall arrangement and control, and the cost required to manufacture instant photography film units 20 is effectively reduced.

In the first embodiment, the manufacturing system 90 has at least one free loop, specifically, the second and third free loops 102, 140, in a feed region required to position the first continuous member 50 for thereby efficiently manufacturing instant photography film units 20 and speeding up the overall process of manufacturing instant photography film units 20.

Specifically, of the first, second, and third continuous members 50, 58, 68, the second continuous member 58 for forming the photosensitive sheet 30 tends to shrink easily due to temperature changes and humidity changes caused by the heat bonding process. Therefore, after the second continuous member 58 is bonded to the first continuous member 50 in the first heat bonding station 64 until the second continuous member 58 reaches the second station 78, the second continuous member 58 is liable to shrink to a relatively large extent. As a result, the first continuous member 50 to which the second continuous member 58 is bonded may be displaced in the direction indicated by the arrow X upon shrinkage of the second continuous member 58.

As shown in FIG. 3, the various dimensions of the instant photography film unit 20 are set to values with respect to the image frame 22, and hence the image frame 22 serves as a positioning reference for various processing steps in the manufacturing system 90. Therefore, if the first continuous member 50 is displaced in the feeding direction upon shrinkage of the second continuous member 58, then the pods 40, the traps 42, or the spacers 32 change their position relative to the image frame 22, possibly making the produced instant photography film unit 20 defective. Particularly, since the distance by which the joined assembly is fed in the direction indicated by the arrow X is large in the manufacturing system 90, errors accumulated each time the joined assembly is fed a pitch or pitches at a time reach a large level, tending to cause the first continuous member 50 to be positionally displaced. When the manufacturing system 90 interrupts its operation, the second continuous member 58 shrinks largely, and the first continuous member 50 is positionally displaced.

According to the first embodiment, the second free loop 102 is provided in the feed region where the first continuous member 50 needs to be positioned, and upstream of the second free loop 102, the first continuous member 50 is fed constant pitches at a time under constant tension by the master drum 106, while at the same time the traps 42 are attached to the first continuous member 50, the mark 53 is formed on the first continuous member 50, and the pods 40 are attached to the first continuous member 50.

Downstream of the second free loop 102, the position of the mark 53 on the first continuous member 50 is detected in the mark detecting station 57a, and the main feed drum 138 is controlled for its operation based on the detected position of the mark 53 to control the distance by which the first continuous member 50 is fed, in units of 10 $\mu$m, for example. Therefore, the traps 42, the pods 40, and the rails 65 can reliably be attached to the image frame 22 with desired dimensional accuracy, so that high-quality instant photography film units 20 can efficiently be manufactured.

The distance from the punching station 59 to the fourth heat bonding station 76 is relatively long. Therefore, by moving the flap sealing unit 134 in the feeding direction in each pitch time interval, the various parts can be heat-bonded accurately with respect to the image frame 22. As the second continuous member 58 shrinks, the heat bonding units 128, 130, 132 are positionally adjusted in a direction opposite to the direction indicated by the arrow X for performing the processing in the first, second, and third heat-bonding stations 64, 66, 72.

In the first embodiment, furthermore, after the mask sheet 24, the photosensitive sheet 30, and the cover sheet 36 are stacked and bonded together in the form of the first, second, and third continuous members 50, 58, 68, they are cut off together into instant photography film units 20. Accordingly, a complex and expensive control system for positioning and bonding sheets, e.g., the photosensitive sheet 30 and the cover sheet 36, separated in the process to a continuous member, e.g., the first continuous member 50, is not required. Thus, the manufacturing system 90 is simpler in overall arrangement than the conventional system, and the cost required to manufacture instant photography film units 20 is effectively reduced.

In the first embodiment, the servomotors 152, 154 are synchronously controlled by the controller 162 to feed the joined assembly two pitches at a time up to the fourth heat-bonding station 76, and feed the joined assembly one pitch at a time when it is cut off in the cutting station 78.

More specifically, the pitch time required for the heat-bonding process in the first through fourth heat-bonding stations 64, 66, 72, 76 is relatively long. The heat-bonding process in these stations can efficiently be performed by setting the distance by which the joined assembly is to be fed at a time, to a plurality of pitches, e.g., two pitches. For the cutting process in the cutting station 78, the distance by which the joined assembly is to be fed at a time is set to one pitch, so that no unwanted idle time is produced in the cutting process. As a consequence, the overall process of manufacturing instant photography film units 20 can effectively be speeded up.

In the first embodiment, the joined assembly is fed two pitches at a time upstream of the fourth heat-bonding station 76. However, the joined assembly may be fed three or more pitches at a time upstream of the fourth heat-bonding station 76, if necessary. In the trap attaching station 54, the pod attaching station 56, or the punching station 59, the joined assembly may be fed one pitch at a time. Stated otherwise, by feeding the joined assembly a plurality of pitches at a time at least in the bonding processes where the pitch time is relatively long, the overall process of manufacturing instant photography film units 20 can easily be speeded up.

In the first embodiment, when an instant photography film unit 20 is cut off in the cutting station 78, the four corners thereof are beveled into the beveled corners 48. Therefore, when successively produced instant photography film units 20 are stacked in the stacking station 80 or fed along, they are prevented from being stacked or fed in error due to being caught by sharp corners which would otherwise remain on the instant photography film units 20.

The instant photography film unit 20 has outer dimensions substantially equal to those of an ID card specified according to ISO 7810 or JIS X6301. Therefore, it is not necessary to use a special storage folder for storing exposed instant photography film units, but a general card holder or the like may be used to organize, store, and save exposed instant photography film units.

Figure 8:
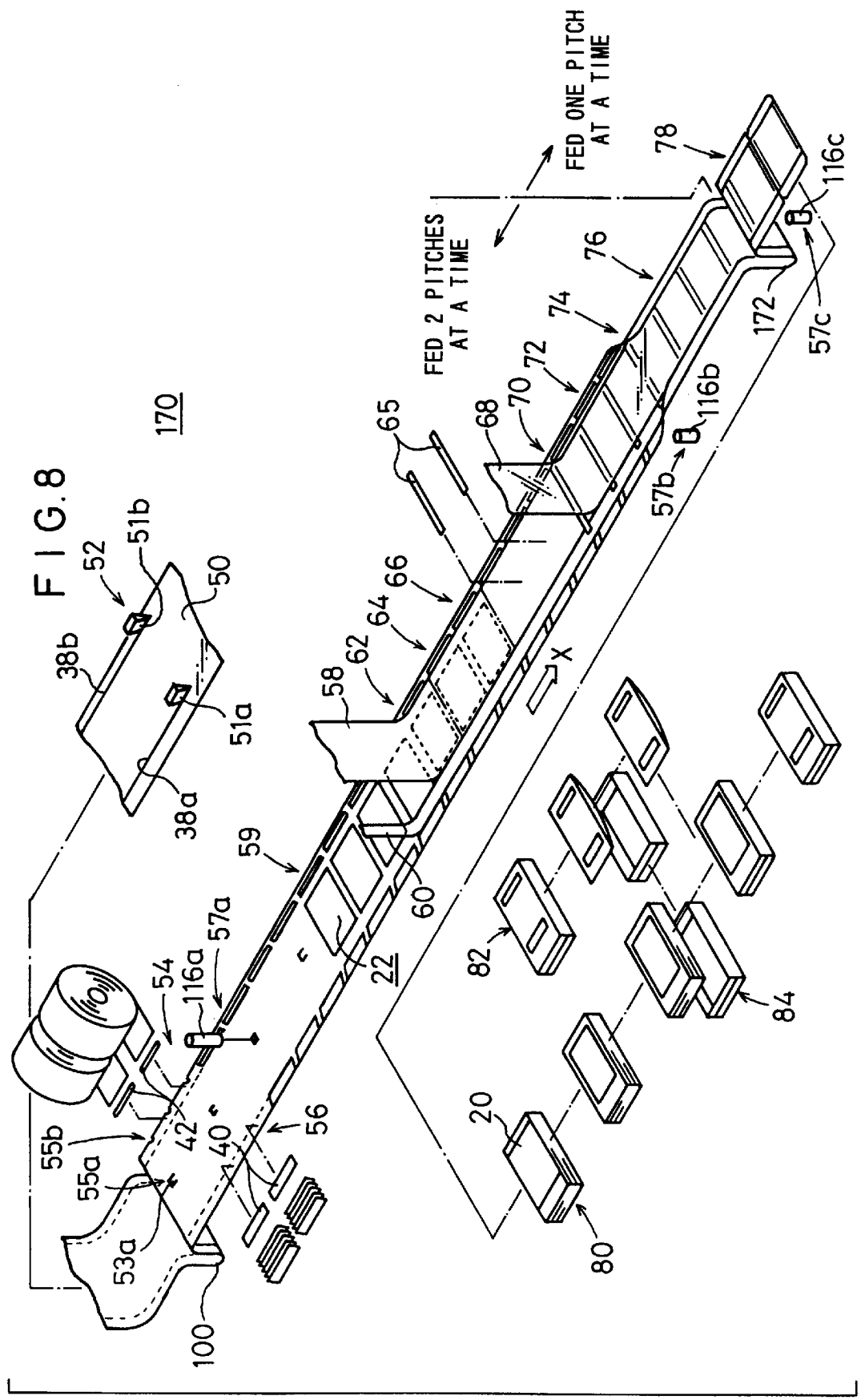
FIG. 8 is a schematic perspective view illustrative of a method of manufacturing an instant photography film unit according to a second embodiment of the present invention.
Figure 9:
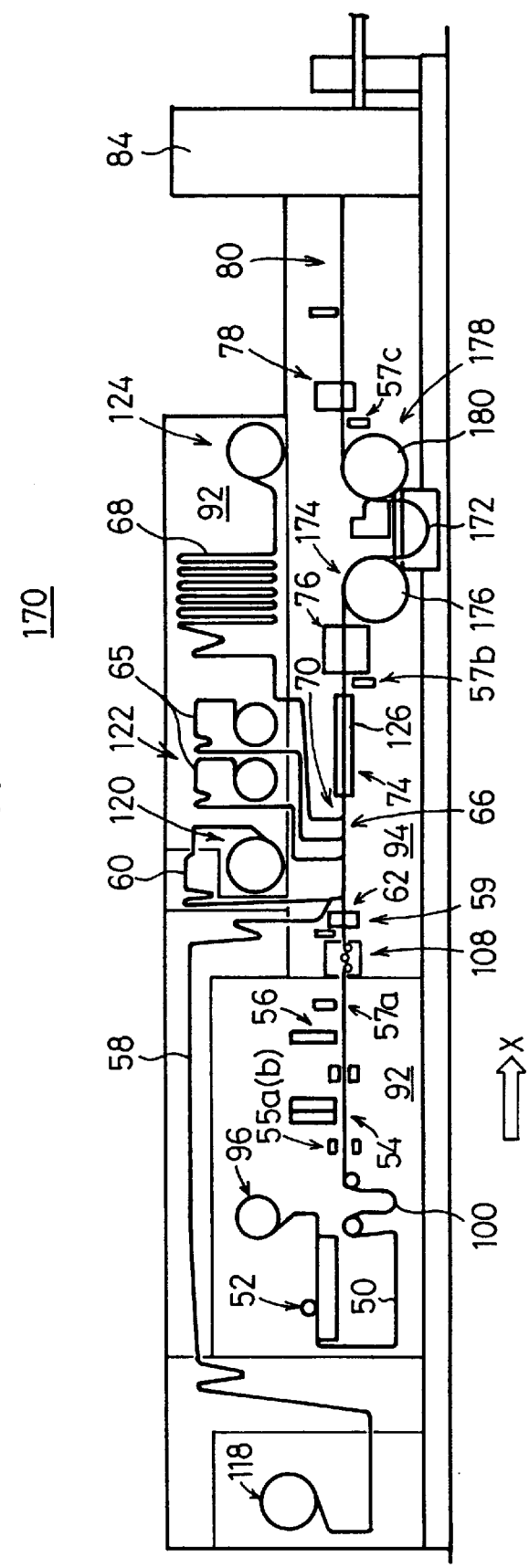
FIG. 9 is a schematic side elevational view of a manufacturing system for carrying out the manufacturing method according to the second embodiment.
Figure 10:
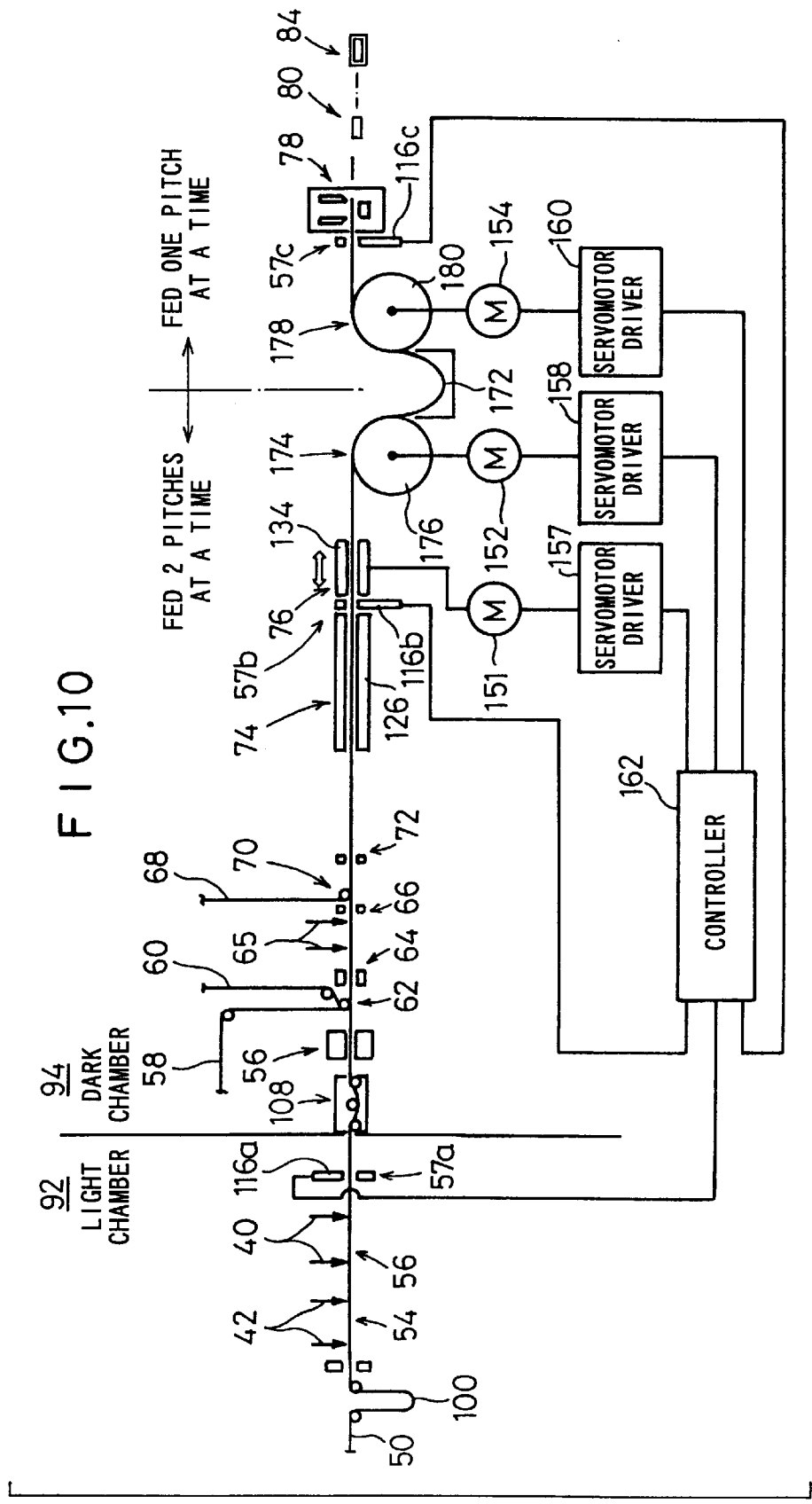
FIG. 10 is a schematic side elevational view, partly in block form, of the manufacturing system shown in FIG. 9 which includes a control arrangement.
Figure 11:
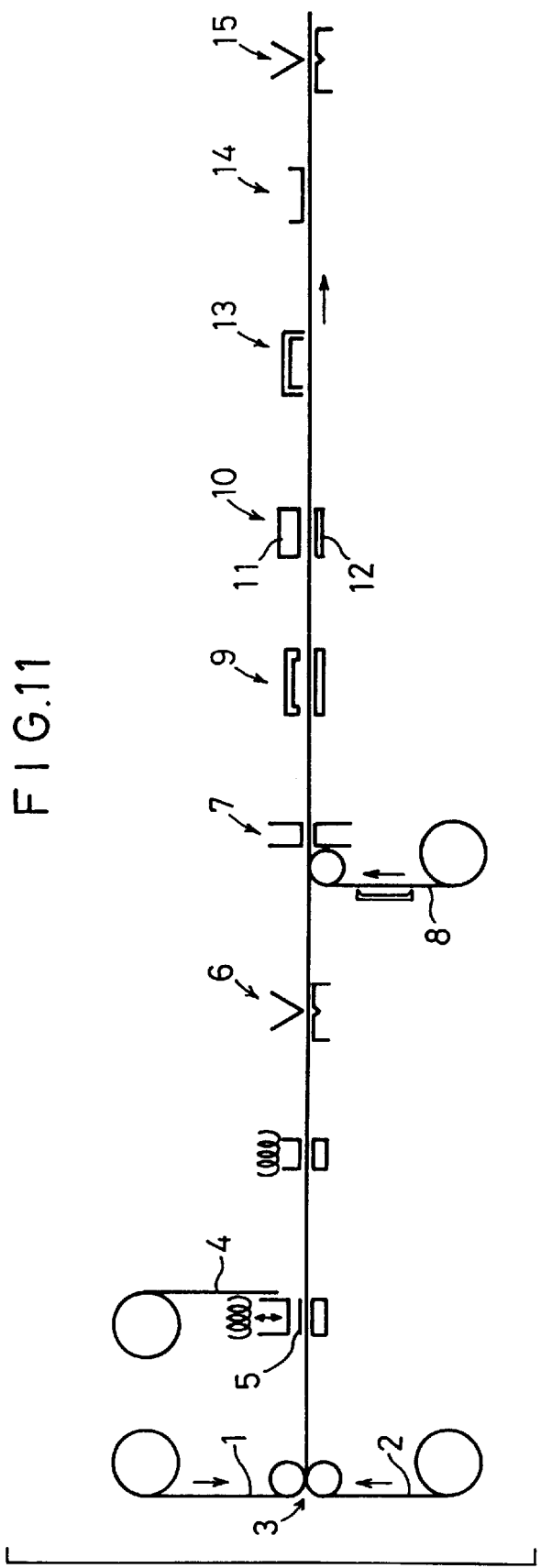
FIG. 11 is a schematic side elevational view of a conventional manufacturing system.

FIG. 8 schematically illustrates a method of manufacturing an instant photography film unit 20 according to a second embodiment of the present invention. FIGS. 9 and 10 schematically show a manufacturing system 170 for carrying out the manufacturing method according to the second embodiment. Those parts of the manufacturing system 170 which are identical to those of the manufacturing system 90 according to the first embodiment are denoted by identical reference characters, and will not be described in detail below.

The manufacturing system 170 has a single free loop 172 in a feed region required to position the first continuous member 50. Upstream of the free loop 172, the first continuous member 50 is fed two or more pitches at a time by a main feed drum 176 of a first feed means 174. Downstream of the free loop 172, the first continuous member 50 is fed one or more pitches at a time by a cutting feed drum 180 of a second feed means 178.

The mark forming station 55a and the air hole forming station 55b, the trap attaching station 54, the pod attaching station 56, and the punching station 59 are disposed successively downstream of the fold forming station 52.

The manufacturing system 170 thus constructed operates in substantially the same manner as with the manufacturing system 90 according to the first embodiment, according to the operation sequence shown in FIG. 7. In operation, the first continuous member 50 is fed a predetermined number of pitches at a time by the main feed drum 176 from the mark forming station 55a and the air hole forming station 55b to the fourth heat-bonding station 76. Thereafter, the first continuous member 50 is fed one pitch, for example, at a time by the cutting feed drum 180, and cut off into an instant photography film unit 20 in the cutting station 78.

Then, a predetermined number of instant photography film units 20 are stacked in the stacking station 80, and reversed and automatically placed into a film pack 82 in the packaging station 84.

In the second embodiment, as described above, the process of manufacturing an instant photography film unit 20 and placing a predetermined number of instant photography film units 20 into a film pack 82 to produce a packaged product is automatically performed. Since the worker is not required to manually package instant photography film units 20 in the dark chamber 94, the overall process of manufacturing an instant photography film unit 20 can easily be speeded up and made highly efficient. Therefore, the second embodiment offers the same advantages as those of the first embodiment.

While the manufacturing system 170 is in normal operation, but not in an abnormal state such as a system shutdown, relative positional deviations of the image frame 22 and other components, e.g., the pods 40 and the traps 42, in the feeding direction due to shrinkage of the first continuous member 50 vary in a moderate wavy fashion. At this time, depending on such wavy variations of the relative positional deviations, the rate at which the first continuous member 50 and the second and third continuous members 58, 68 superposed thereon are fed is controlled by the rate of feed by the main feed drum 176. Consequently, the relative positions of the image frame 22 and the other components in the feeding direction can appropriately be adjusted.

More specifically, when the first continuous member 50 shrinks, positional variations thereof are corrected to feed the first continuous member 50 at preset constant pitches for thereby controlling the feed of the first continuous member 50 in most upstream regions where the first continuous member 50 needs to be positioned, i.e., from the mark forming station 55a and the air hole forming station 55b to the trap attaching station 54, and also from the pod attaching station 56 to the punching station 59. Specifically, the mark detecting station 57a detects the position of the mark 53, and the rate of feed by the main feed drum 176 is controlled based on a deviation of the detected position so as to feed the first continuous member 50 at preset constant pitches. As the first continuous member 50 moves downstream progressively away from the mark forming station 55a, the response of the first continuous member 50 to the constant pitch feed control is lowered. Therefore, the detected position of the mark 53 is set to a position capable of accurately detecting the deviation of the detected position. In this manner, the relative positions of the mark 53 and the pods 40, the traps 42, etc., i.e., the relative positions of the image frame 22 and the pods 40, the traps 42, and the relative position of the image frame 22 and the spacers 32, can be adjusted within a desired accuracy range.

The flap sealing unit 134 that is spaced a certain number of pitches from the first, second, and third heat-bonding stations 64, 66, 72 tends to suffer a sealing failure due to slight variations of the sealed position when the joined assembly thermally shrinks and the main feed drum 176 holds the joined assembly insufficiently, causing jamming or other trouble. To overcome this shortcoming, the image frame 22 is detected in the frame detecting station 57b, and the flap sealing unit 134 is controlled to move in the direction indicated by the arrow X so as to keep the image frame 22 and the sealed position in a constant relative positional relationship. Alternatively, a loop may be formed in the joined assembly for controlling the position of the joined assembly immediately upstream of the former 126 that is connected upstream of the flap sealing unit 134.

However, this alternative solution would result in an increase in the distance that the joined assembly needs to be fed.

In the cutting station 78, a single cutting mechanism may be used as it can adapt itself to high-speed operation and also for the same reason as the flap sealing unit 134. Therefore, the free loop 172 is provided, and the image frame 22 is detected at the cutting feed drum 180 for controlling the position of the joined assembly and feeding the joined assembly.

Upon a system shutdown, the joined assembly suffers a large thermal shrinkage particularly in the first through third heat-bonding stations 64, 66, 72, tending to cause the relative positions of the image frame 22 and other components to deviate largely. To avoid this drawback, before the joined assembly starts to be fed when the manufacturing system 170 starts to operate, the main feed drum 176 is controlled to return the joined assembly until the deviation of the detected position of the mark 53 becomes nil in the mark detecting station 57a. Accordingly, even upon a system shutdown, the relative positions of the image frame 22 and other components can be adjusted within a desired accuracy range.

In the second embodiment, since only one free loop 172 is employed, the manufacturing system 170 is further simplified in its entire arrangement, and high-quality instant photography film units 20 can efficiently be manufactured.

In the first and second embodiments, the photosensitive sheet 30 is constructed of the second continuous member 58. However, the photosensitive sheet 30 may be constructed of the third continuous member 68.

In the first and second embodiments, the instant photography film unit 20 has outer dimensions substantially equal to those of an ID card. However, an instant photography film unit having an outer dimension H1 of 108 mm in the transverse direction and an outer dimension H2 of 85.6 mm in the longitudinal direction may be manufactured according to the present invention. For manufacturing such an instant photography film unit, one pitch for feeding the joined assembly in the manufacturing systems 90, 170 is set to 108 mm.

With the method of and the apparatus for manufacturing an instant photography film unit according to the present invention, after instant photography film units have been manufactured, a predetermined number of instant photography film units are stacked and automatically housed in a film pack. Therefore, the process of manufacturing and packaging instant photography film units is automatically and efficiently performed. Since the worker is not required to manually package instant photography film units in the dark chamber, the overall process can easily be speeded up and made highly efficient.

According to the present invention, furthermore, at least one free loop is provided in a feed region required to position a continuous member in the process of manufacturing an instant photography film unit for thereby controlling the feed of the continuous member. Therefore, various components can be joined to the continuous member highly accurately with respect to a desired positioning reference position, and the number of pitches for feeding the continuous member can be changed before and after the free loop. As a result, high-quality instant photography film units can be manufactured quickly and efficiently.

According to the present invention, moreover, a plurality of containers which store a developing solution and a plurality of traps for trapping an excessive developing solution are simultaneously supplied to a continuous member at respective opposite side edges of an image frame of the continuous member. Therefore, the containers and the traps are efficiently attached to the continuous member for thereby easily speeding up the overall process of manufacturing an instant photography film unit.

In the method of manufacturing an instant photography film unit according to the present invention, the first continuous member which will form the mask sheet and the second and third continuous members which will form the above two sheets are bonded together in a stacked state, and then cut together to a predetermined length for thereby producing an instant photography film unit. Accordingly, the instant photography film unit can automatically be manufactured with a simple arrangement, and the cost to manufacture the instant photography film unit is effectively reduced.

At least in the bonding step, the first through third continuous members are fed a plurality of pitches at a time, so that undesired idle times due to the difference between pitch times are not introduced, and the overall process of manufacturing an instant photography film unit can be speeded up and made efficient.

Although certain preferred embodiments of the present invention have been shown and described in detail, it should be understood that various changes and modifications may be made therein without departing from the scope of the appended claims.

What is claimed is:

1. A method of manufacturing an instant photography film unit which comprises a mask sheet having an image frame and two sheets, one of which has a photosensitive layer, superposed and bonded to each other, and a pod storing a developing solution and disposed on the sheets in a predetermined position, the arrangement being such that the developing solution supplied from the pod extends between said two sheets to form an image, said method comprising the steps of:

bonding said mask sheet and said two sheets, at least one of which comprises a continuous member, to each other in a laminated state;

cutting said continuous member to a predetermined length for thereby producing a self-developing instant photography film unit;

automatically stacking a predetermined number of said instant photography film units; and automatically housing the stacked instant photography film units into a film pack.

2. A method according to claim 1, further comprising the steps of:

supplying said mask sheet and said two sheets as first, second, and third continuous members, respectively;

bonding said first, second, and third continuous members to each other; and thereafter, cutting the bonded first, second, and third continuous members together.

3. A method according to claim 1, further comprising the step of:

beveling corners of said instant photography film unit.

4. A method according to claim 1, wherein said mask sheet has foldable thin portions disposed on opposite marginal side edges of said image frame and having a predetermined depth across said mask sheet.

5. A method according to claim 1, wherein said pod and a trap for trapping excessive developing solution are attached to said mask sheet on opposite marginal side edges of said image frame, and wherein said mask sheet has a deformed area disposed at said trap and serving as an air passage.

6. A method of manufacturing an instant photography film unit which comprises a mask sheet having an image frame and two sheets, one of which has a photosensitive layer, superposed and bonded to each other, and a pod storing a developing solution and disposed on the sheets in a predetermined position, the arrangement being such that the developing solution supplied from the pod extends between said two sheets to form an image, said method comprising the steps of:

bonding said mask sheet and said two sheets, at least one of which comprises a continuous member, to each other in a laminated state;

cutting said continuous member to a predetermined length for thereby producing a self-developing instant photography film unit; and producing at least one free loop in a feed region required to position said continuous member for controlling feeding of said continuous member.

7. A method according to claim 6, further comprising the steps of:

feeding said continuous member a predetermined pitch interval at a time with first feed means upstream of said free loop; and feeding said continuous member a predetermined pitch interval at a time with second feed means downstream of said free loop.

8. A method according to claim 7, further comprising the steps of:
   feeding said continuous member a predetermined number of pitches at a time with said first feed means; and
   detecting a positioned area of said continuous member and feeding said continuous member a predetermined number of pitches at a time with said second feed means based on the detected positioned area, downstream of said free loop.

9. A method according to claim 6, wherein said instant photography film unit has an outer dimension in a direction perpendicular to a longitudinal direction in which said instant photography film unit extends, said outer dimension being used as a unit pitch for feeding said continuous member, and wherein said continuous member is fed a first number of pitches at a time in said step of cutting said continuous member and fed a second number of pitches, different from said first number of pitches, at a time upstream of said step of cutting said continuous member across said free loop.

10. A method according to claim 6, further comprising the steps of:
    supplying said mask sheet and said two sheets as first, second, and third continuous members, respectively;
    bonding said first, second, and third continuous members to each other; and
    thereafter, cutting the bonded first, second, and third continuous members together.

11. A method according to claim 6, further comprising the step of:
    beveling corners of said instant photography film unit.

12. A method according to claim 6, wherein said mask sheet has foldable thin portions disposed on opposite marginal side edges of said image frame and having a predetermined depth across said mask sheet.

13. A method according to claim 6, wherein said pod and a trap for trapping excessive developing solution are attached to said mask sheet on opposite marginal side edges of said image frame, and wherein said mask sheet has a deformed area disposed at said trap and serving as an air passage.

14. A method of manufacturing an instant photography film unit which comprises a mask sheet having an image frame and two sheets, one of which has a photosensitive layer, superposed and bonded to each other, and a pod storing a developing solution and disposed on the sheets in a predetermined position, the arrangement being such that the developing solution supplied from the pod extends between said two sheets to form an image, said method comprising the steps of:
    supplying at least one of a plurality of pods storing a developing solution and a trap for trapping an excessive developing solution to a marginal side edge of a continuous member when said continuous member is stopped;
    thereafter bonding said mask sheet and said two sheets, one of which comprises said continuous member, to each other in a laminated state; and
    thereafter cutting said continuous member to a predetermined length for thereby producing a self-developing instant photography film unit.

15. A method of manufacturing an instant photography film unit which comprises a mask sheet having an image frame and two sheets, one of which has a photosensitive layer, superposed and bonded to each other, and a pod storing a developing solution and disposed on the sheets in a predetermined position, the arrangement being such that the developing solution supplied from the pod extends between said two sheets to form an image, said method comprising the steps of:
    supplying said mask sheet and said two sheets as first, second, and third continuous members, respectively;
    supplying at least one of a plurality of pods storing a developing solution and a trap for trapping an excessive developing solution to a marginal side edge of said image frame when said first continuous member is stopped;
    bonding said first, second, and third continuous members to each other; and
    thereafter, cutting the bonded first, second, and third continuous members together.

16. A method of manufacturing an instant photography film unit which comprises a mask sheet having an image frame and two sheets, one of which has a photosensitive layer, superposed and bonded to each other, and a pod storing a developing solution and disposed on the sheets in a predetermined position, the arrangement being such that the developing solution supplied from the pod extends between said two sheets to form an image, said method comprising the steps of:
    supplying at least one of a plurality of pods storing a developing solution and a trap for trapping an excessive developing solution to a marginal side edge of said image frame when said continuous member is stopped;
    bonding said mask sheet and said two sheets, at least one of which comprises a continuous member, to each other in a laminated state;
    cutting said continuous member to a predetermined length for thereby producing a self-developing instant photography film unit; and
    beveling corners of said instant photography film unit.

17. A method according to claim 14, wherein said mask sheet has foldable thin portions disposed on opposite marginal side edges of said image frame and having a predetermined depth across said mask sheet.

18. A method according to claim 14, wherein said pod and a trap for trapping excessive developing solution are attached to said mask sheet on opposite marginal side edges of said image frame, and wherein said mask sheet has a deformed area disposed at said trap and serving as an air passage.

19. A method of manufacturing an instant photography film unit which comprises a mask sheet having an image frame and two sheets, one of which has a photosensitive layer, superposed and bonded to each other, and a pod storing a developing solution and disposed on the sheets in a predetermined position, the arrangement being such that the developing solution supplied from the pod extends between said two sheets to form an image, said method comprising the steps of:
    bonding a first continuous member for forming said mask sheet and second and third continuous members for forming said two sheets, respectively, to each other in a laminated state;
    cutting said first, second, and third continuous members to a predetermined length for thereby producing a self-developing instant photography film unit, said instant photography film unit has an outer dimension in a direction perpendicular to a longitudinal direction in which said instant photography film unit extends, said outer dimension being used as a unit pitch for feeding said continuous member; and feeding said first, second, and third continuous members a plurality of pitches at a time at least in said step of bonding said first, second, and third continuous members to each other.

20. A method according to claim 19, further comprising the steps of:

feeding said first, second, and third continuous members one pitch at a time in said step of cutting said first, second, and third continuous members;

feeding said first, second, and third continuous members a plurality of pitches at a time in said step of bonding first, second, and third continuous members; and synchronously controlling said feeding in said step of cutting said first, second, and third continuous members and said feeding step in said feeding in said step of bonding said first, second, and third continuous members.

21. A method according to claim 19, wherein said instant photography film unit has an outer dimension in the longitudinal direction of 85.6 mm and an outer dimension in the direction perpendicular to the longitudinal direction of 54 mm, said unit pitch comprising the length of a shorter side of said instant photography film unit which is represented by one of said outer dimensions.

22. A method of manufacturing an instant photography film unit which comprises a mask sheet having an image frame and two sheets, one of which has a photosensitive layer, superposed and bonded to each other, and a pod storing a developing solution and disposed on the sheets in a predetermined position, the arrangement being such that the developing solution supplied from the pod extends between said two sheets to form an image, said method comprising the steps of:

preparing a first continuous member for forming said mask sheet and second and third continuous members for forming said two sheets, respectively;

bonding said first and second continuous members to each other, and thereafter bonding spacers to opposite marginal side edges of said image frame of said first continuous member which extend perpendicularly to the feeding direction in which said first, second, and third continuous members are fed;

superposing and bonding said third continuous member to said first and second continuous members to each other with said spacers interposed therebetween;

folding back and bonding opposite marginal side edges of said first continuous member to said third continuous member; and cutting said first, second, and third continuous members together.

23. A method according to claim 22, further comprising the steps of:

attaching a pod storing a developing solution and trap for trapping an excessive developing solution respectively to opposite side marginal edges of said first continuous member which extend in said feeding direction;

punching said image frame out of said first continuous member; and thereafter, bonding said first and second continuous members to each other.

24. A method according to claim 22, wherein said instant photography film unit has an outer dimension in a direction perpendicular to a longitudinal direction in which said instant photography film unit extends, said outer dimension being used as a unit pitch for feeding said continuous member, and wherein said instant photography film unit has an outer dimension in the longitudinal direction of 85.6 mm and an outer dimension in the direction perpendicular to the longitudinal direction of 54 mm, said unit pitch comprising the length of a shorter side of said instant photography film unit which is represented by one of said outer dimensions.

\* \* \* \* \*